US005673321A

United States Patent [19]
Lee

[11] Patent Number: 5,673,321
[45] Date of Patent: Sep. 30, 1997

[54] EFFICIENT SELECTION AND MIXING OF MULTIPLE SUB-WORD ITEMS PACKED INTO TWO OR MORE COMPUTER WORDS

[75] Inventor: Ruby Bei-Loh Lee, Los Altos Hills, Calif.

[73] Assignee: Hewlett-Packard Company, Palo Alto, Calif.

[21] Appl. No.: 496,487

[22] Filed: Jun. 29, 1995

[51] Int. Cl.$^6$ .................................................. G06F 9/315
[52] U.S. Cl. .................. 380/37; 364/200; 364/900; 364/DIG. 1; 364/DIG. 2; 364/259.8; 364/260.5; 364/260.7; 364/947.6
[58] Field of Search .................. 380/37; 364/260.5, 364/260.7, 947.6, 259.8

[56] References Cited

U.S. PATENT DOCUMENTS

| 3,535,694 | 10/1970 | Anacker et al. | 364/759 |
|---|---|---|---|
| 3,887,799 | 6/1975 | Lindgren | 395/775 |
| 3,914,744 | 10/1975 | Brown | 364/715.08 |
| 5,042,007 | 8/1991 | D'Luna | 365/78 |
| 5,113,516 | 5/1992 | Johnson | 395/500 |
| 5,423,010 | 6/1995 | Mizukami | 395/375 |

FOREIGN PATENT DOCUMENTS

A 0 122 016   3/1984   European Pat. Off. .......... G06F 7/00

OTHER PUBLICATIONS

IBM Technical Disclosure Bulletin, vol. 17, No. 6, Nov. 1974, NY, N.Y., pp. 1575–1576, "Bit Manipulator".
Ruby B. Lee, Precision Architecture, *IEEE Computer*, vol. 22, No. 1, Jan. 1989, pp. 78–91.

Primary Examiner—Gilberto Barrón, Jr.

[57] ABSTRACT

A computer system facilitates efficient mixing of multiple sub-word items. Mixing circuitry is connected to a plurality of registers and a result register. The mixing circuitry mixes multiple sub-word items packed into the plurality of registers. The multiple sub-word items, when mixed, are placed in the result register. In the preferred embodiment, the mixing circuitry is implemented using a plurality of multiplexors. Control circuitry, connected to the control inputs of the multiplexors, generates control signals which control the mixing of multiple sub-word items by the multiplexors.

17 Claims, 8 Drawing Sheets

EFFICIENT SELECTION AND MIXING OF MULTIPLE SUB-WORD ITEMS PACKED INTO TWO OR MORE COMPUTER WORDS

BACKGROUND

The present invention concerns efficient selection and mixing of multiple sub-word items packed into two or more computer words.

Various operations performed by a computing system require the simultaneous selection of several items packed into multiple computer words to produce a resulting word with the selected items.

One example of such a computer operation is a matrix transposition. In a matrix of four by four elements, where each row of four elements is packed into one computer word, four computer words can hold the entire sixteen elements of the matrix. The four elements of a column of the matrix are spread out over the four words. In order to place the four elements of a column into one word, a matrix transposition is performed. The performance of a matrix transposition requires selecting one item out of each of four words, and packing this into a resulting word, for each of the four columns. In a typical prior art computing system, such an operation would take twenty or more instructions.

SUMMARY OF THE INVENTION

In accordance with the preferred embodiment of the present invention, a computer system is presented which facilitates the efficient mixing of multiple sub-word items. Mixing circuitry is connected to a plurality of registers and a result register. The mixing circuitry mixes multiple sub-word items packed into the plurality of registers. The multiple sub-word items, when mixed, are placed in the result register. In the preferred embodiment, the mixing circuitry is implemented using a plurality of multiplexors. Control circuitry, connected to the control inputs of the multiplexors, generates control signals which control the mixing of multiple sub-word items by the multiplexors.

For example, in response to a mix word left instruction, a leftmost word in a first doubleword register is concatenated with a leftmost word in a second doubleword register and the result is placed in a third doubleword register. In response to a mix word right instruction, a rightmost word in the first doubleword register is concatenated with a rightmost word in the second doubleword register, and the result is placed in the third doubleword register.

In response to a mix half-word left instruction, a first half-word of the first doubleword register, a first half-word of the second doubleword register, a third half-word of the first doubleword register and a third half-word of the second doubleword register are concatenated and the result is placed in the third doubleword register. In response to a mix half-word right instruction, a second half-word of the first doubleword register, a second half-word of the second doubleword register, a fourth half-word of the first doubleword register and a fourth half-word of the second doubleword register are concatenated and the result is placed in a third doubleword register.

In response to a mix byte left instruction, a first byte of the first doubleword register, a first byte of the second doubleword register, a third byte of the first doubleword register, a third byte of the second doubleword register, a fifth byte of the first doubleword register, a fifth byte of the second doubleword register, a seventh byte of the first doubleword register and a seventh byte of the second doubleword register are concatenated and the result is placed in a third doubleword register. In response to a mix byte right instruction, a second byte of the first doubleword register, a second byte of the second doubleword register, a fourth byte of the first doubleword register, a fourth byte of the second doubleword register, a sixth byte of the first doubleword register, a sixth byte of the second doubleword register, an eighth byte of the first doubleword register and an eighth byte of the second doubleword register are concatenated and the result is placed in a third doubleword register. As will be understood by persons of ordinary skill in the art, other mixing options are within the spirit of the invention.

The present invention affords significant performance benefits for operations performed by a computing system which require the simultaneous selection of several items packed into multiple computer words to produce a resulting word with the selected items. For example, for the case, described above, of a transposition of a matrix of four by four elements where each four element row is packed into a computer word, the present invention provides for a significant improvement over the prior art. For an embodiment of the present invention which performs mixing of multiple sub-word items packed into two computer words, the transposition can be performed in eight instructions.

A significant advantage of the preferred embodiment implementation of mix circuitry using rows of multiplexors is that in many computer designs shift circuitry are already implemented using rows of multiplexors. The circuitry used in the execution of common shift instructions, therefore, may also be used to implement the mixing of multiple sub-word items.

DESCRIPTION OF THE PREFERRED EMBODIMENT

Figure 1:
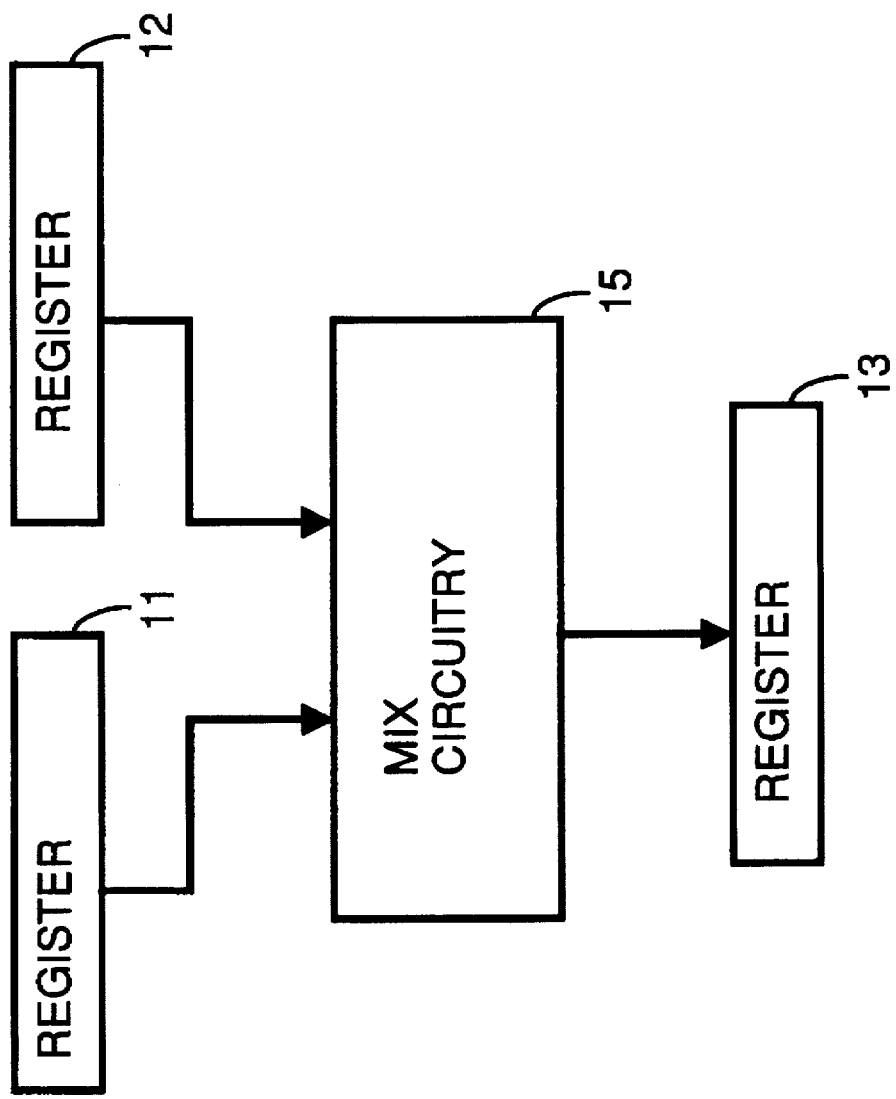
FIG. 1 shows a simplified block diagram of circuitry which performs mixing of multiple sub-word items packed into two computer words in accordance with the preferred embodiment of the present invention.

FIG. 1 shows a simplified block diagram of circuitry which performs mixing (also called interleaving) of multiple sub-word items packed into two computer doublewords in accordance with the preferred embodiment of the present invention. A first computer doubleword is placed in a register 11. A second computer doubleword is placed in a register 12. Mix circuitry 15 performs mixing of multiple sub-word items packed into the computer doubleword in register 11 and the computer doubleword in register 12.

In the following discussion, a doubleword is considered to be sixty-four bits, a word is considered to be thirty-two bits, a half-word is considered to be sixteen bits and a byte is considered to be eight bits. As will be understood by persons of ordinary skill in the art, the number of bits in a double word and/or a word and/or a half word varies depending upon user or system definitions.

For example, the first computer doubleword in register 11 consists of eight bytes (sixty-four bits): byte a, byte b, byte c, byte d, byte e, byte f, byte g and byte h. The first computer doubleword in register 11, is referred to as computer doubleword abcdefgh. Likewise, the second computer doubleword in register 12 also consists of eight bytes (sixty-four bits): byte A, byte B, byte C, byte D, byte E, byte F, byte G and byte H. The second computer doubleword in register 12 therefore is referred to as computer doubleword ABCDEFGH.

Word and sub-word items within computer doubleword abcdefgh and computer doubleword ABCDEFGH can be selected and mixed by mix circuitry 15. For example, in response to a mix word left instruction, mix circuitry 15 places within a register 13 the left word of computer doubleword abcdefgh and the left word of computer doubleword ABCDEFGH. The result in register 13 is the new computer doubleword abcdABCD. In response to a mix word right instruction, mix circuitry 15 places within register 13 the right word of computer doubleword abcdefgh and the right word of computer doubleword ABCDEFGH. The result in register 13 is the new computer doubleword efghEFGH.

In response to a mix half-word left instruction, mix circuitry 15 places within register 13 every other half-word of computer doubleword abcdefgh and every other half-word of computer doubleword ABCDEFGH, beginning with the leftmost half-word of computer doubleword abcdefgh and the leftmost half-word of computer doubleword ABCDEFGH, respectively. The result in register 13 is the new computer doubleword abABefEF. In response to a mix half-word right instruction, mix circuitry 15 places within register 13 every other half-word of computer doubleword abcdefgh and every other half-word of computer doubleword ABCDEFGH, including the rightmost half-word of computer doubleword abcdefgh and the rightmost half-word of computer doubleword ABCDEFGH, respectively. The result in register 13 is the new computer doubleword cdCDghGH.

In response to a mix byte left instruction, mix circuitry 15 places within register 13 every other byte of computer doubleword abcdefgh and every other byte of computer doubleword ABCDEFGH, beginning with the leftmost byte of computer doubleword abcdefgh and the leftmost byte of computer doubleword ABCDEFGH, respectively. The result in register 13 is the new computer doubleword aAcCeEgG. In response to a mix byte right instruction, mix circuitry 15 places within register 13 every other byte of computer doubleword abcdefgh and every other byte of computer doubleword ABCDEFGH, including the rightmost byte of computer doubleword abcdefgh and the rightmost byte of computer doubleword ABCDEFGH, respectively. The result in register 13 is the new computer doubleword bBdDfFhH.

While the above discussion illustrates mixing of sub-word items where the sub-word items are one byte or more, it will be understood by those skilled in the art that mix circuitry 15 can be implemented to allow for mixing of sub-words of any length. For example of sub-word items of one bit, two bits, three bits or any number of bits may be mixed by mix circuitry 15. The subwords can also be of different sizes.

Figure 2:
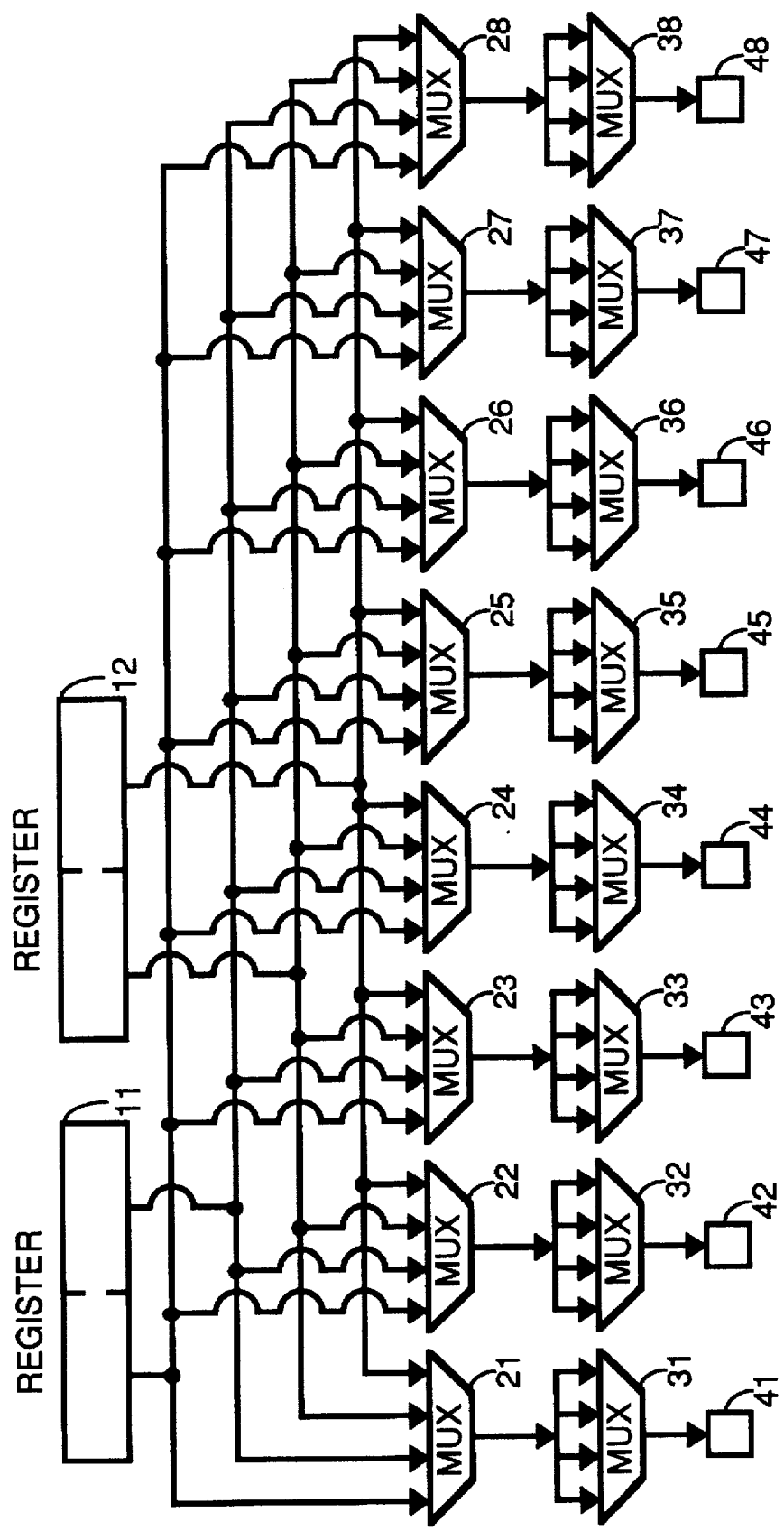
FIG. 2 shows a conceptual design of circuitry which performs mixing of multiple sub-word items packed into two computer words in accordance with a preferred embodiment of the present invention.

FIG. 2 shows a conceptual example of logic which may be utilized to implement mix circuitry 15. The thirty-two bit left word of the computer doubleword in register 11, the thirty-two bit right word of the computer doubleword in register 11, the thirty-two bit left word of the computer doubleword in register 12 and the thirty-two bit right word of the computer doubleword in register 12 each serve as input to a four-to-one multiplexor (mux) 21, a four-to-one multiplexor 22, a four-to-one multiplexor 23, a four-to-one multiplexor 24, a four-to-one multiplexor 25, a four-to-one multiplexor 26, a four-to-one multiplexor 27 and a four-to-one multiplexor 28.

Four-to-one multiplexor 21 selects one of the thirty-two bit left word of the computer doubleword in register 11, the thirty-two bit right word of the computer doubleword in register 11, the thirty-two bit left word of the computer doubleword in register 12 and the thirty-two bit right word of the computer doubleword in register 12 to forward to a four-to-one multiplexor 31. Four-to-one multiplexor 22 selects one of the thirty-two bit left word of the computer doubleword in register 11, the thirty-two bit right word of the computer doubleword in register 11, the thirty-two bit left word of the computer doubleword in register 12 and the thirty-two bit right word of the computer doubleword in register 12 to forward to a four-to-one multiplexor 32. Four-to-one multiplexor 23 selects one of the thirty-two bit left word of the computer doubleword in register 11, the thirty-two bit right word of the computer doubleword in register 11, the thirty-two bit left word of the computer doubleword in register 12 and the thirty-two bit right word of the computer doubleword in register 12 to forward to a four-to-one multiplexor 33. And so on for a four-to-one multiplexor 34, a four-to-one multiplexor 35, a four-to-one multiplexor 36, a four-to-one multiplexor 37 and a four-to-one multiplexor 38.

In FIG. 2, register 13 is represented as a byte register portion 41, a byte register portion 42, a byte register portion 43, a byte register portion 44, a byte register portion 45, a byte register portion 46, a byte register portion 47 and a byte register portion 48. Four-to-one multiplexor 31 selects one byte from the half-word selected by multiplexor 21 to be placed in byte register portion 41. Four-to-one multiplexor 32 selects one byte from the half-word selected by multiplexor 22 to be placed in byte register portion 42. Four-to-one multiplexor 33 selects one byte from the half-word selected by multiplexor 23 to be placed in byte register portion 43. And so on for four-to-one multiplexor 34, four-to-one multiplexor 35, four-to-one multiplexor 36, four-to-one multiplexor 37 and four-to-one multiplexor 38.

Figure 3:
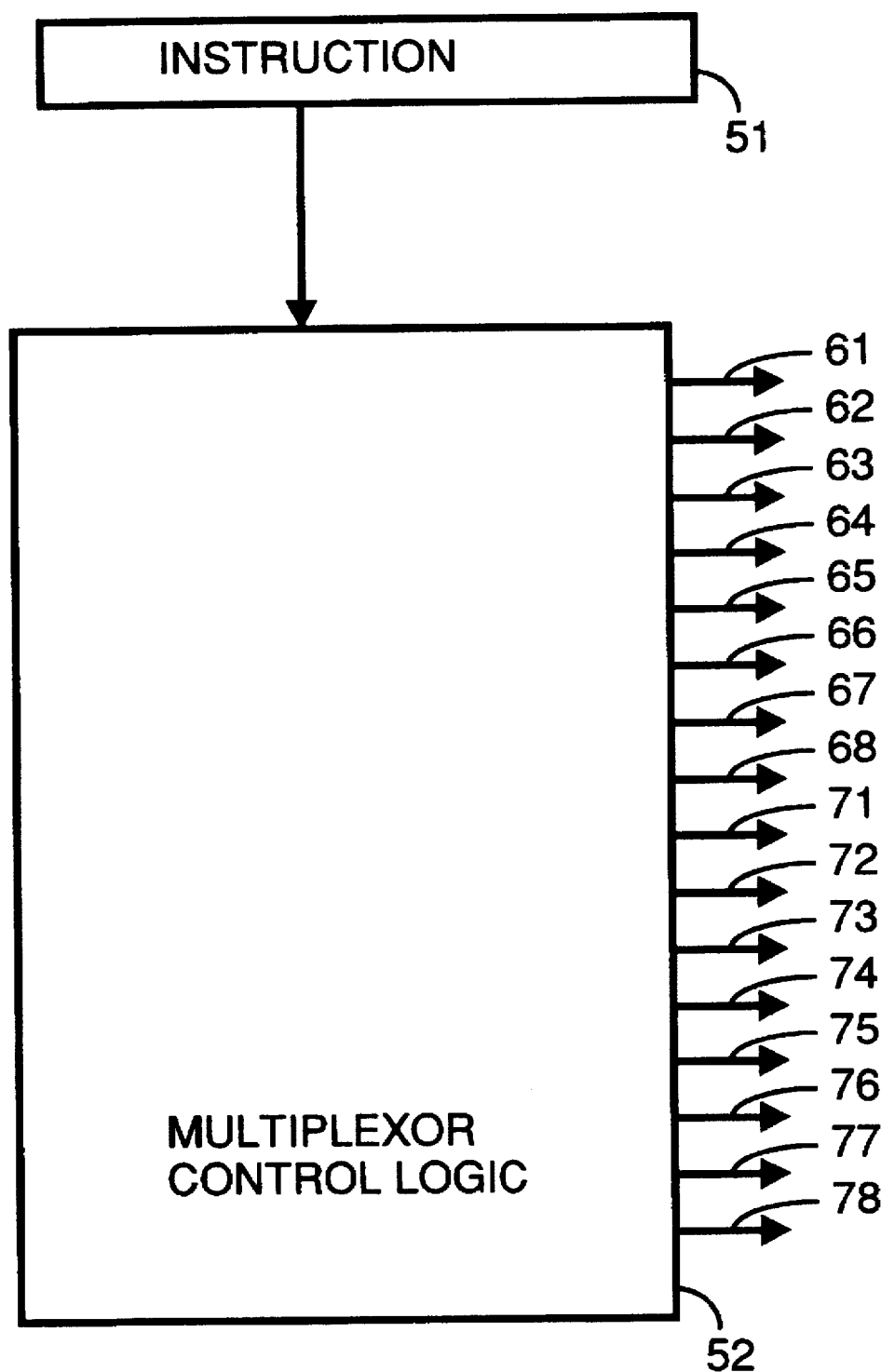
FIG. 3 shows a simplified block diagram of selection control logic which controls mixing of multiple sub-word items packed into two computer words in accordance with a preferred embodiment of the present invention.

FIG. 3 shows multiplexor control logic 52 which, in response to an instruction 51, generates two-bit control signals for each of four-to-one multiplexors 21 through 28 and 31 through 38. Multiplexor control logic 52 generates a two bit control signal 61 for multiplexor 21, a two bit control signal 62 for multiplexor 22, a two bit control signal 63 for multiplexor 23, a two bit control signal 64 for multiplexor 24, a two bit control signal 65 for multiplexor 25, a two bit control signal 66 for multiplexor 26, a two bit control signal 67 for multiplexor 27, a two bit control signal 68 for multiplexor 28, a two bit control signal 71 for multiplexor 31, a two bit control signal 72 for multiplexor 32, a two bit control signal 73 for multiplexor 33, a two bit control signal 74 for multiplexor 34, a two bit control signal 75 for multiplexor 35, a two bit control signal 76 for multiplexor 36, a two bit control signal 77 for multiplexor 37 and a two bit control signal 78 for multiplexor 38.

For example, for each multiplexor in the multiplexor arrays shown in FIG. 2, a control signal with a value of $11_{base\ 2}$ ($11_2$), results in the multiplexor selecting the leftmost input. A control signal with a value of $10_{base\ 2}$ ($10_2$), results in the multiplexor selecting the next leftmost input. A control signal with a value of $01_{base\ 2}$ ($01_2$), results in the multiplexer selecting the next to leftmost input. A control signal with a value of $01_{base\ 2}$ ($01_2$), results in the multiplexor selecting the rightmost input.

As will be understood by persons of ordinary skill in the art, Table 1 below shows control signal values, as generated by multiplexor control logic 52, for the mix word left (word/left) instruction, the mix word right (word/right) instruction, the mix half-word left (half/left) instruction, the mix half-word right (half/right) instruction, the mix byte left (byte/left) instruction and the mix byte right (byte/right) instruction discussed above.

TABLE 1

| | Mix Instruction | | | | | |
|---|---|---|---|---|---|---|
| Control Signals | Mix word/left | Mix word/right | Mix half/left | Mix half/right | Mix byte/left | Mix byte/right |
| 61 | $11_2$ | $10_2$ | $11_2$ | $11_2$ | $11_2$ | $11_2$ |
| 62 | $11_2$ | $10_2$ | $11_2$ | $11_2$ | $01_2$ | $01_2$ |
| 63 | $11_2$ | $10_2$ | $01_2$ | $01_2$ | $11_2$ | $11_2$ |
| 64 | $11_2$ | $10_2$ | $01_2$ | $01_2$ | $01_2$ | $01_2$ |
| 65 | $01_2$ | $00_2$ | $10_2$ | $10_2$ | $10_2$ | $10_2$ |
| 66 | $01_2$ | $00_2$ | $10_2$ | $10_2$ | $00_2$ | $00_2$ |
| 67 | $01_2$ | $00_2$ | $00_2$ | $00_2$ | $10_2$ | $10_2$ |
| 68 | $01_2$ | $00_2$ | $00_2$ | $00_2$ | $00_2$ | $00_2$ |
| 71 | $11_2$ | $11_2$ | $11_2$ | $01_2$ | $11_2$ | $10_2$ |
| 72 | $10_2$ | $10_2$ | $10_2$ | $00_2$ | $11_2$ | $10_2$ |
| 73 | $01_2$ | $01_2$ | $11_2$ | $01_2$ | $01_2$ | $00_2$ |
| 74 | $00_2$ | $00_2$ | $10_2$ | $00_2$ | $01_2$ | $00_2$ |
| 75 | $11_2$ | $11_2$ | $11_2$ | $01_2$ | $11_2$ | $10_2$ |
| 76 | $10_2$ | $10_2$ | $10_2$ | $00_2$ | $11_2$ | $10_2$ |
| 77 | $01_2$ | $01_2$ | $11_2$ | $01_2$ | $01_2$ | $00_2$ |
| 78 | $00_2$ | $00_2$ | $10_2$ | $00_2$ | $01_2$ | $00_2$ |

As will be understood by persons of ordinary skill in the art, FIG. 2 shows an implementation of mix circuitry 15 for the general case wherein any byte of the computer doubleword in register 11 and any byte of the computer doubleword in register 12 may be placed in any byte of register 13. For certain computing systems it may not be desirable to facilitate the placement of certain combinations of bytes within register 13. In such a case it will be understood by persons of ordinary skill in the art that in accordance with standard principles of computer hardware design, the number and input sizes of multiplexors required to implement mix circuitry 15 can generally be reduced from the sixteen multiplexors shown in the conceptual design shown in FIG. 2 which are used to implement the general case. As also will be understood by persons of ordinary skill in the art, the n-tuber of control signals can be significantly reduced when mix circuitry 15 is not required to allow any byte of the computer doubleword in register 11 and any byte of the computer doubleword in register 12 to be placed in any byte of register 13.

Additionally, one advantage of the preferred embodiment implementation of mix circuitry 15 using rows of multiplexors is that in many computer designs shift circuitry is already implemented using rows of multiplexors. Existing shift circuitry may be easily modified to allow for execution of various mix instruction as well as shift instructions.

In order to allow for shifts of one bit increments, an additional row (or additional rows) of multiplexors may be added. For example, a row of eight-to-one multiplexors may be added. Alternately, a row of four-to-one and a row of two-to-one multiplexors may be added.

Figure 4:
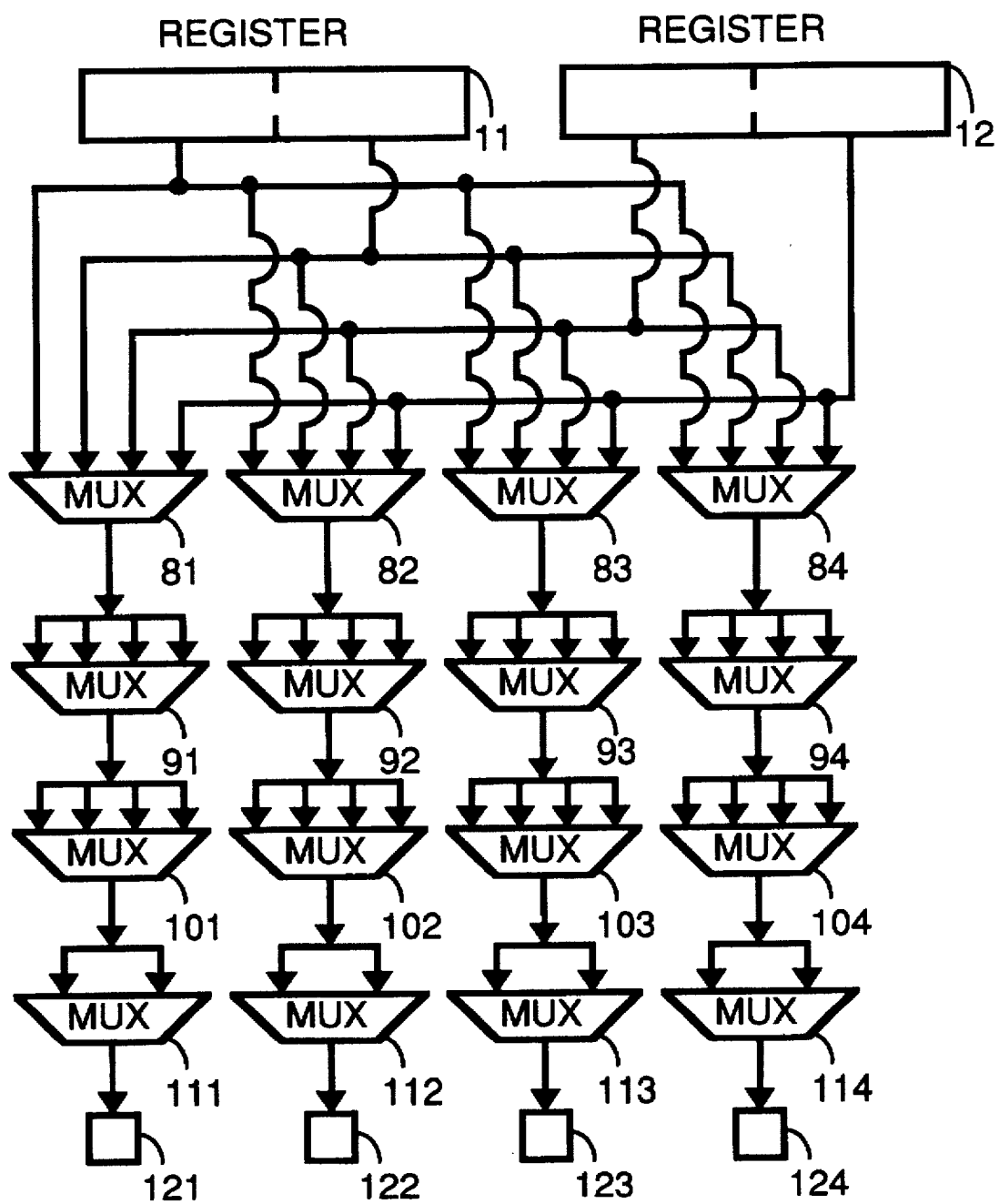
FIG. 4 shows additional detail of circuitry which performs bit-level mixing of multiple sub-word items packed into two computer words in accordance with an alternate preferred embodiment of the present invention.

For example, FIG. 4, shows an example of logic which may be utilized to implement four bits of mix circuitry 15. The thirty-two bit left word of the computer doubleword in register 11, the thirty-two bit right word of the computer doubleword in register 11, the thirty-two bit left word of the computer doubleword in register 12 and the thirty-two bit right word of the computer doubleword in register 12 each serve as input to a four-to-one multiplexor 81, a four-to-one multiplexor 82, a four-to-one multiplexor 83 and a four-to-one multiplexor 84.

Four-to-one multiplexor 81 selects one of the thirty-two bit left word of the computer doubleword in register 11, the thirty-two bit right word of the computer doubleword in register 11, the thirty-two bit left word of the computer doubleword in register 12 and the thirty-two bit right word of the computer doubleword in register 12 to forward to a four-to-one multiplexor 91. Four-to-one multiplexor 82 selects one of the thirty-two bit left word of the computer doubleword in register 11, the thirty-two bit right word of the computer doubleword in register 11, the thirty-two bit left word of the computer doubleword in register 12 and the thirty-two bit right word of the computer doubleword in register 12 to forward to a four-to-one multiplexor 92. And so on for a four-to-one multiplexor 93 and a four-to-one multiplexor 94.

Four-to-one multiplexor 91 selects one byte from the half-word selected by multiplexor 81 to be forwarded to a four-to-one multiplexor 101. Four-to-one multiplexor 92 selects one byte from the half-word selected by multiplexor 82 to be forwarded to a four-to-one multiplexor 102. And so on for a four-to-one multiplexor 103 and a four-to-one multiplexor 104.

Four-to-one multiplexor 101 selects two bits from the byte selected by multiplexor 91 to be forwarded to a two-to-one multiplexor 111. Four-to-one multiplexor 102 selects two bits from the byte selected by multiplexor 92 to be forwarded to a two-to-one multiplexor 112. And so on for a two-to-one multiplexor 113 and a two-to-one multiplexor 114.

Two-to-one multiplexor 111 selects one of the two bits from multiplexor 101 to be a generated bit 121. Two-to-one multiplexor 112 selects one of the two bits from multiplexor 102 to be a generated bit 122. Two-to-one multiplexor 113 selects one of the two bits from multiplexor 103 to be a generated bit 123. Two-to-one multiplexor 114 selects one of the two bits from multiplexor 104 to be a generated bit 124.

FIG. 4 shows a conceptual implementation for the most general case wherein any bit of the computer doubleword in register 11 and any bit of the computer doubleword in register 12 may be placed in any bit of register 13. For most computing systems it may not be desirable to facilitate the placement of certain combinations of bits within register 13. In such a case it will be understood by persons of ordinary skill in the art that in accordance with standard principles of computer hardware design, the number of multiplexors required to implement mix circuitry 15 can be significantly reduced from the two hundred and fifty six multiplexors which would be required to fully implement mix circuitry for the most general case using the logic structure shown in FIG. 4.

As will be shown by the discussion below, a shifter implemented with rows of multiplexors can be modified, e.g., by adding multiplexors and modifying the circuitry which generates control signals in order to allow execution of the mix and/or interleave instructions.

While the above-discussion has focused on logic which performs mixing of multiple sub-word items packed into two computer doublewords, the principles of the present invention also are applicable to systems which perform mixing of multiple sub-word items packed into more than two computer doublewords.

Figure 5:
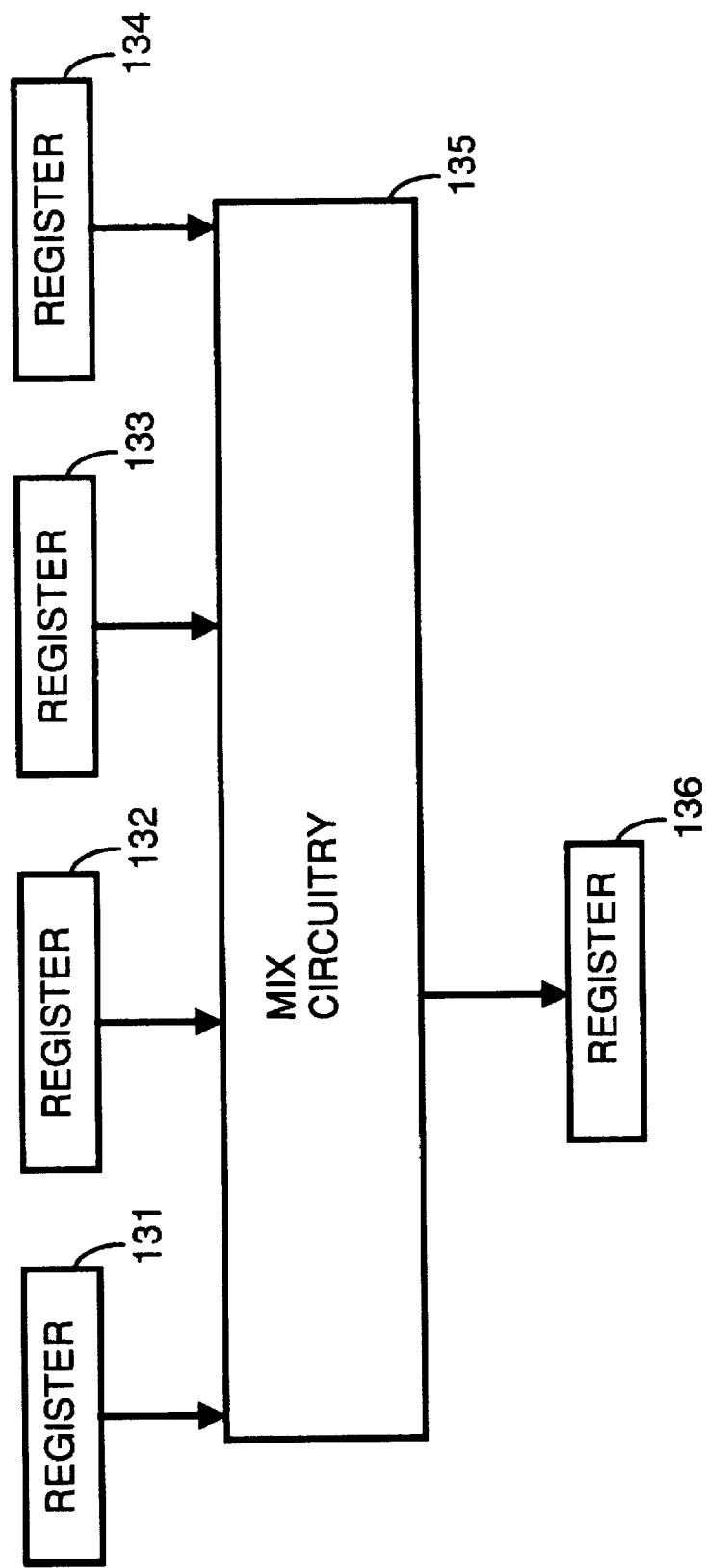
FIG. 5 shows a simplified block diagram of circuitry which performs mixing of multiple sub-word items packed into four computer words in accordance with another alternate preferred embodiment of the present invention.

For example, FIG. 5 shows a simplified block diagram of circuitry which performs mixing of multiple sub-word items packed into four computer doublewords in accordance with an alternate preferred embodiment of the present invention. A first computer doubleword is placed in a register 131. A second computer doubleword is placed in a register 132. A third computer doubleword is placed in a register 133. A fourth computer doubleword is placed in a register 134. Mix circuitry 135 performs mixing of multiple sub-word items packed into the computer doubleword in register 131, the computer doubleword in register 132, the computer doubleword in register 133 and the computer doubleword in register 134.

The present invention affords significant performance benefits for operations performed by a computing system which require the simultaneous selection of several items packed into multiple computer doublewords to produce a resulting doubleword with the selected items. For example, the present invention provides for a significant improvement in the transposition of a matrix of four by four elements where each four element row is packed into a computer doubleword. For an embodiment of the present invention which performs mixing of multiple sub-word items packed into two computer doublewords (i.e. as shown in FIGS. 1, 2 and 3), the transposition can be performed in eight instructions.

Further, the teachings of the present invention can be adapted to existing shifter technology with only slight modifications. For example, Table 2 below shows the result of a shift right (or rotate) for hardware which performs half-word shift right on a sixty-four bit doubleword (abcd) where "a" represents the high order sixteen bits, "b" represents the next sixteen bits, "c" represents the next sixteen bits, and "d" represents the low order sixteen bits.

TABLE 2

| Number of Bits Shifted | Rotate Target Register | Shift Right Target Register |
| --- | --- | --- |
| 0 | abcd | abcd |
| 16 | dabc | -abc |
| 32 | cdab | --ab |
| 48 | bcda | ---a |

For the shift right, the "–" could be, for example a "0" or a sign extension bit (i.e., the sign bit is replicated). Also, Table 2 above, shows shifting in sixteen bit portions. This can be accomplished in the first stage of the shifter. Successive stages of multiplexors allow a shifter to shift to bit resolution.

Figure 6:
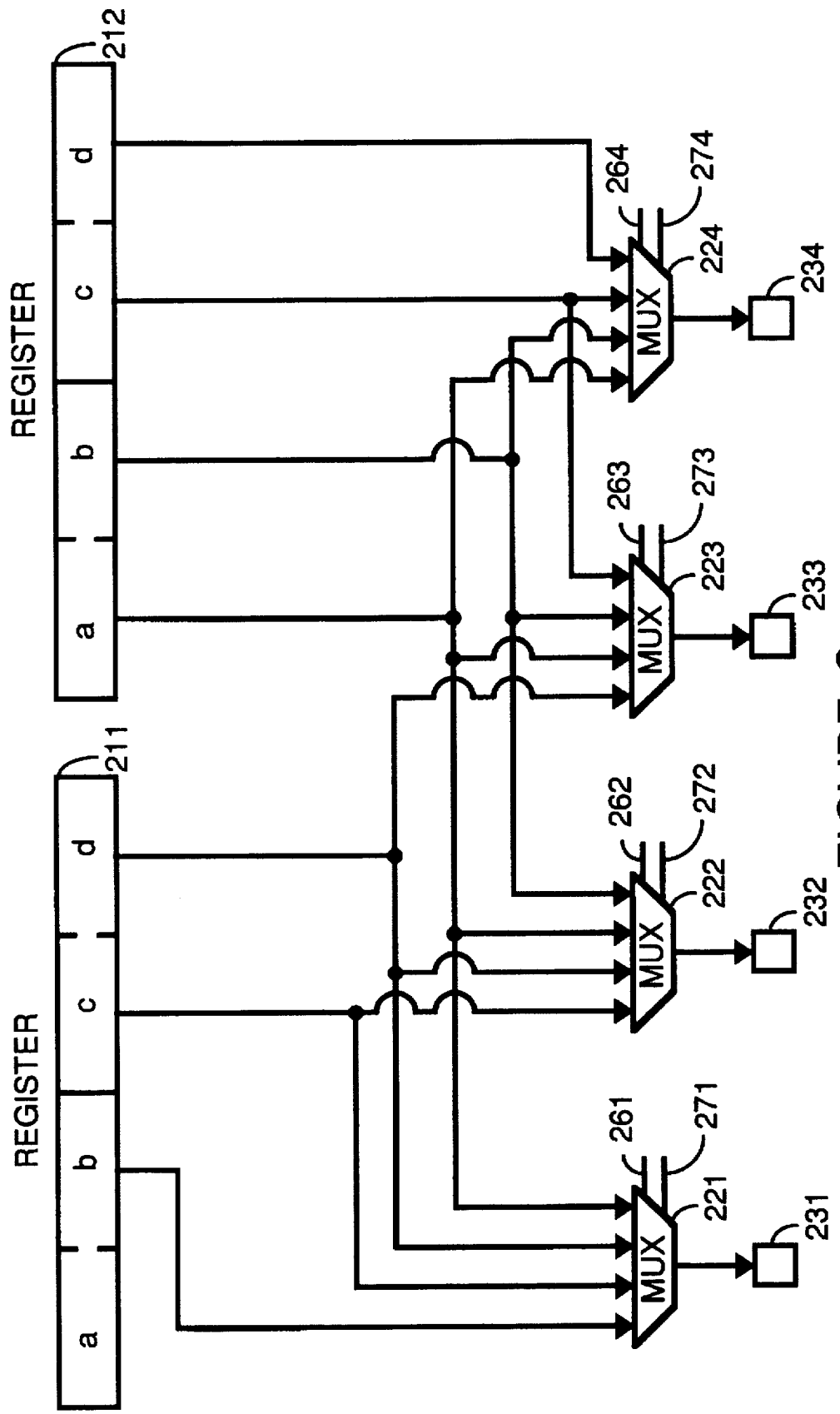
FIG. 6 shows a block diagram of circuitry which may be used to implement a multiplexing instruction in accordance with a preferred embodiment of the present invention.

Many conventional shifters already require two different source registers. For example, the shift double instruction in a Precision Architecture RISC (PA-RISC®) processor (see Ruby B. Lee, *Precision Architecture* IEEE *Computer*, Vol. 22, Num. 1, Jan. 1989, pp. 78–91) concatenates two source registers and shifts the pair of registers together. The rotate, shown in Table 2, could be implemented, for example, using a duplicate single source register as shown in FIG. 6. FIG. 6 shows a register 211 and a register 212, each containing the sixty-four bit doubleword abcd. A multiplexor 221, a multiplexor 222, a multiplexor 223 and, a multiplexor 224 each have two-bit control signals. Multiplexor 221 has an input 261 and an input 271. Multiplexor 222 has an input 262 and an input 272. Multiplexor 223 has an input 263 and an input 273. Multiplexor 224 has an input 264 and an input 274. For the implementation of a rotate, the multiplexors 221 through 224 may be tied together to a common two-bit control signal. That is inputs 261, 262, 263 and 264 are tied together, and inputs 271, 272, 273 and 274 are tied together. The control signals for the multiplexors 221 through 224 determine which sixteen bit half-words are placed into sixteen bit outputs 231, 232, 233, and 234. When the control signal is the value $00_2$, a value abcd is placed in the target register. When the control signal is the value $01_2$, a value dabc is placed in the target register. When the control signal is the value $10_2$, a value cdab is placed in the target register. When the control signal is the value $11_2$, a value bcda is placed in the target register.

In an implementation of a preferred embodiment of the present invention, the logic shown in FIG. 6 is modified to allow for a sixty-four bit shift and placing a different doubleword in each register. For example, by driving each of the control signals for each multiplexor 221 through 224, separately, various new instructions may be implemented, as discussed below.

Additional functionality may also be added. For example, Table 3 below shows the result of a shift right for hardware which performs half-word shift right on a sixty-four bit doubleword (abcd) where "a" represents the high order sixteen bits, "b" represents the next sixteen bits, "c" represents the next sixteen bits, and "d" represents the low order sixteen bits. When shifting the sixty-four bit doubleword "abcd" to the right, there is shifted in a sixty-four bit doubleword "ABCD" where "A" represents the high order sixteen bits, "B" represents the next sixteen bits, "C" represents the next sixteen bits, and "D" represents the low order sixteen bits.

TABLE 3

| Number of Bits Shifted | Target Register |
| --- | --- |
| 0 | abcd |
| 16 | Dabc |
| 32 | CDab |
| 48 | BCDa |
| 64 | ABCD |

Figure 7:
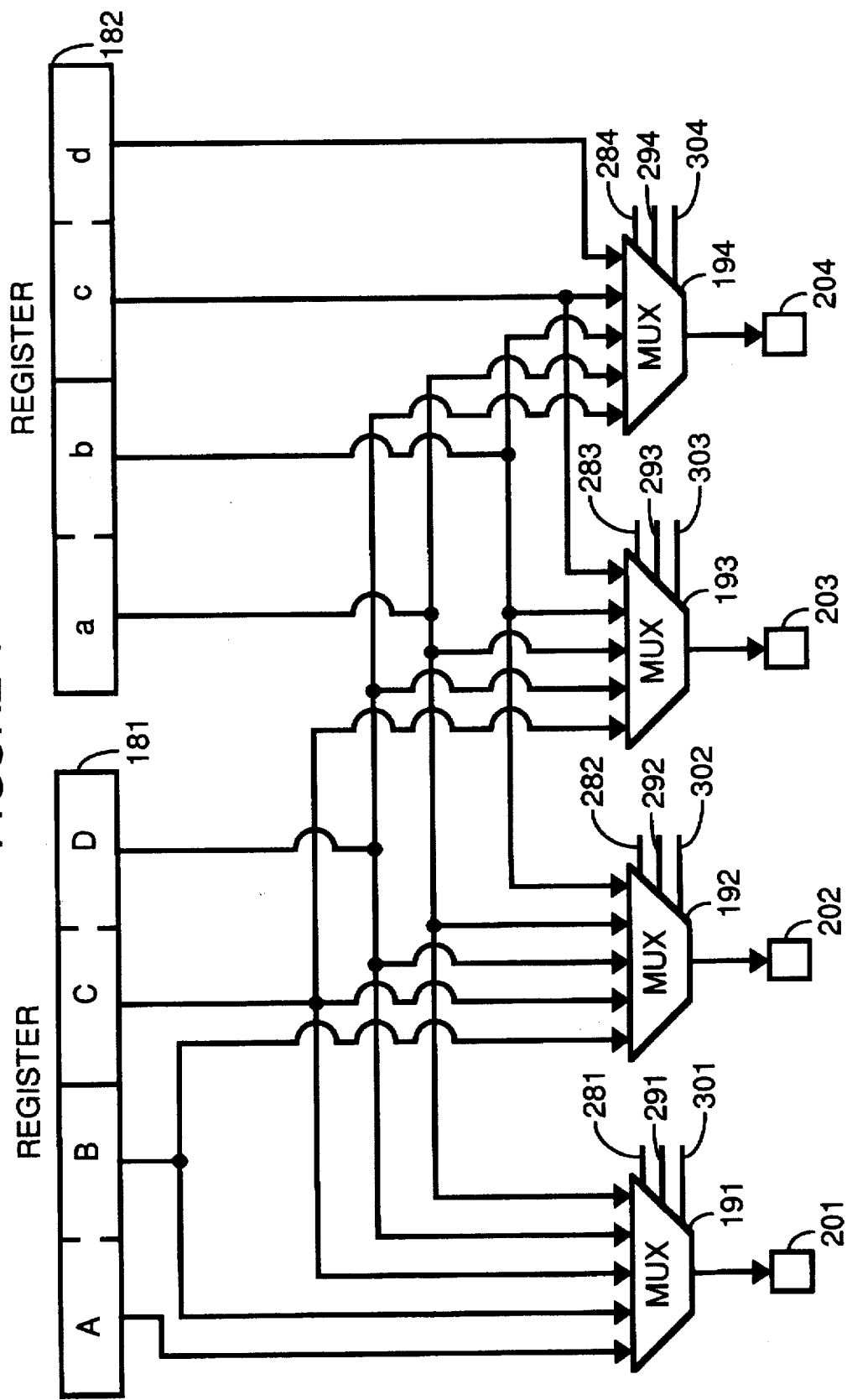
FIG. 7 shows a block diagram of circuitry which may be used to implement various mix instructions in accordance with a preferred embodiment of the present invention.

FIG. 7 shows an implementation in which a register 181 contains the sixty-four bit doubleword ABCD and a register 182 contains the sixty-four bit doubleword abcd. A multiplexor 191, a multiplexor 192, a multiplexor 193 and, a multiplexor 194 each have three-bit control signals which are separately controlled. Multiplexor 191 has an input 281, an input 291 and an input 301. Multiplexor 192 has an input 282, an input 292 and an input 302. Multiplexor 193 has an input 283, an input 293 and an input 303. Multiplexor 194 has an input 284, an input 294 and an input 304. The control signals determine which sixteen bit half-words are placed into sixteen bit outputs 201, 202, 203, and 204.

FIG. 7 shows an implementation using four 80×5 bit multiplexors. For applications which include shifting capability, it will probably be preferred to implement the first stage of the shifter using five 64×4 bit multiplexors. This allows reduction of the number of control signals to two per multiplexor. The total member of control signals for the first stage will then be ten, as compared to a total of 12 control signals required for the implementation using four 80×5 bit multiplexors. In addition, the total number of data lines will be 256 lines to implement the first stage of the shifter using five 64×4 bit multiplexors, as compared to a total of 400 data lines for the implementation using four 80×5 bit multiplexors. It is anticipated that further implementations will allow further reduction of data and control lines.

Figure 8:
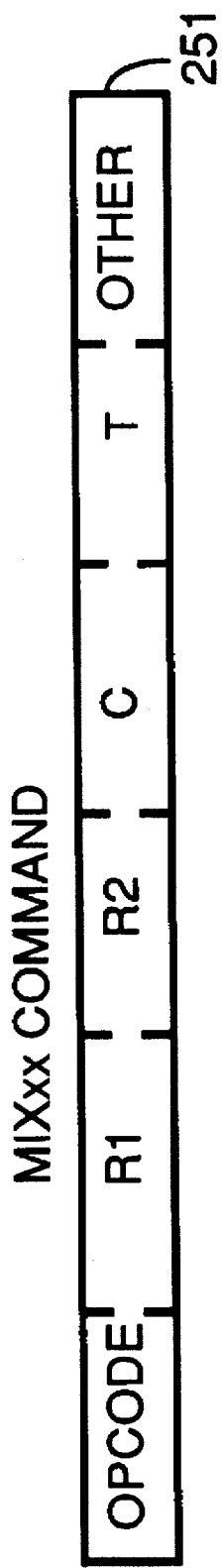
FIG. 8 shows layout of an instruction for various mix instructions in accordance with a preferred embodiment of the present invention.

FIG. 8 shows a computer instruction (MIXxx) 251 which selects sub-word items from the two source registers, R1 and R2, in several pre-defined ways, for example: MIXWL (Mix Word Left) concatenates the left half (32 bits) of R1 with the left half of R2. MIXWR (Mix Word Right) concatenates the right half of R1 with the right half of R2. MIXHL (Mix Half-word Left) concatenates in turn, the first half-words of R1 and R2, followed by the third half-words of R1 and R2. MIXHR (Mix Half-word Right) concatenates in turn, the second half-words of R1 and R2, followed by the fourth half-words of R1 and R2. And so on. The instruction also may contain other fields. As will be understood by persons of ordinary skill in the art, relative locations of the field in an instruction is arbitrary and may be varied without violating the spirit of the invention.

Operation of the MIXxx instruction is as set out in Table 4 below:

TABLE 4

| If | R1 = abcdefgh and R2 = ABCDEFGH, |
| then | for MIXWL: Rt = abcdABCD |
|  | for MIXWR: Rt = efghEFGH |
|  | for MIXHL: Rt = abABefEF |
|  | for MIXHR: Rt = cdCDghGH |
|  | for MIXBL: Rt = aAcCeEgG |
|  | for MIXBR: Rt = bBdDfFhH |

The preferred embodiment may be used in a variety of ways to significantly improve computer operation of some instructions. For example, the MIXxx instructions described above may be used to transpose a 4×4 matrix of half-words contained in four registers, r1, r2, r3, r4, each with 4 half-words as set out in Table 5 below:

TABLE 5

| a1 b1 c1 d1 | r1 |
| a2 b2 c2 d2 | r2 |
| a3 b3 c3 d3 | r3 |
| a4 b4 c4 d4 | r4 |

In Table 5 above, a1, a2, a3, a4, b1, b2, b3, b4, c1, c2, c3, c4, d1, d2, d3 and d4 each represents a sixteen-bit half-word. The result of the transposition of the 4×4 matrix in Table 5, is shown in Table 6 below.

TABLE 6

| a1 a2 a3 a4 | r1 |
| b1 b2 b3 b4 | r2 |
| c1 c2 c3 c4 | r3 |
| d1 d2 d3 d4 | r4 |

The transposition takes eight MIXxx instructions, using two additional registers (t1 and t2). This is the minimum number of instructions possible, given that in each instruction we can only read 2 registers and write 1 register as is commonly the case in microprocessors. The 4×4 transpose operation requires that at least three registers have to be read, to write 1 resulting register. Hence, CEILING [3/2 ]*4=8 instructions, is the theoretical minimum. If an instruction can read 3 registers and write 1 register, then the theoretical minimum is 4 instructions. Table 7 below illustrates the transpose being performed with eight instructions.

TABLE 7

| Result in Target register | Target Register | Instruction |
|---|---|---|
| a1 a2 c1 c2 | t1 | MIXHL r1,r2,t1 |
| b1 b2 d1 d2 | t2 | MIXHR r1,r2,t2 |
| a3 a4 c3 c4 | r2 | MIXHL r3,r4,r2 |
| b3 b4 d3 d4 | r4 | MIXHR r3,r4,r4 |
| a1 a2 a3 a4 | r1 | MIXWL t1,r2,r1 |
| c1 c2 c3 c4 | r3 | MIXWR t1,r2,r3 |
| b1 b2 b3 b4 | r2 | MIXWL t2,r4,r2 |
| d1 d2 d3 d4 | r4 | MIXWR t2,r4,r4 |

Without these MIXxx instructions, the same 4×4 matrix transpose of half-words would take at least twenty instructions, and three additional registers, using an optimized sequence of extract and deposit instructions in, for example, a Precision Architecture RISC processor. See Ruby B. Lee, *Precision Architecture*, IEEE *Computer*, Vol. 22, Num. 1, Jan. 1989, pp. 7891). Therefore, a speedup of 20/8=2.5 is achieved.

Another use of the teaching of the present invention is for utilization of video technology. Video input is often in bytes, and has to be output in RGB format to the display in bytes. However, all internal arithmetic is done in half-words, for more accurate results. For processors with only one shift-merge unit, packing half-words into bytes, and unpacking bytes into half-words, uses many instructions. This can be minimized by just using byte versions of the Mix instructions.

The format for the byte mix instructions is in Table 8 below: follows:

TABLE 8

| Format: | MIXBL r1,r2,rt |
|  | MIXBR r1,r2,rt |

MIXBx selects alternate bytes from two source registers, r1 and r2, in two pre-defied ways: MIXBL alternates the 4 odd bytes of r1 with the 4 odd bytes of r2; MIXBR alternates the 4 even bytes of r1 with the 4 even bytes of r2. The operation is as is set out in Table 9 below:

TABLE 9

| If r1 = a b c d e f g h and r2 = A B C D E F G H, |
| then for MIXBL: rt = a A c C e E g G |
| for MIXBR: rt = b B d D f F h H |

The MIXBL instruction may be used, for example, to unpack and pack bytes into and out of the more significant half of corresponding half-words. This instruction may be used to "unpack" a register with 8 bytes into 2 registers of 4 half-words each, with each byte being the more significant byte of each half-word. There, MIXBL is used with the second source register set to r0. Many computer architectures define r0 as always sourcing a constant zero. Since r0 is a constant zero, all 8 bytes of r0 are "0". This is illustrated by Table 10 below:

TABLE 10

```
If r = a b c d e f g h
  then    MIXBL r,r0,rt1 gives: rt1 = a 0 c 0 e 0 g 0,
  and     MIXBR r,r0,rt2 gives: rt2 = b 0 d 0 f 0 h 0.
```

The adjacent bytes in the original register are now aligned properly in the same half-word tracks in rt1 and rt2 for the use of parallel half-word arithmetic instructions (viz., a0 and b0 are the leftmost half-words of rt1 and rt2, c0 and d0 the next, e0 and f0 next, and g0 and h0 are the least significant half-words of rt1 and rt2).

If it is necessary to work on a pair of adjacent bytes that cross a half-word boundary in the original input byte stream, (e.g., b and c, d and e, f and g), it is only necessary to do one right shift of rt2 to get all 3 pairs of these bytes aligned for parallel half-word arithmetic:

EXTRU (Shift rt2 right by 16 bits):
  rt3=00 b 0 d 0 f0
  (rt1=a0c0e0g0)

After all the computation is done via parallel half-word arithmetic, one can PACK half-words back to words using the same MIXBx instructions on rt1 and rt2:

MIXBL rt1, rt2,r gives: r=a b c d e f g h

The MIXBx instructions may also be used, for example, to unpack and pack bytes into and out of the LESS significant half of corresponding half-words: This is the same as above, except that in unpacking, use r0 as the first source register rather than the second source register. Also, in packing, use the MIXBR instruction rather than the MIXBL instruction. Hence, to

```
unpack:
          If r = a b c d e f g h
          then    MIXBL r0,r,rt1 gives: rt1 = 0 a 0 c 0 e 0 g,
          and     MIXBR r0,r,rt2 gives: rt2 = 0 b 0 d 0 f 0 h.
And to pack:
                  MIXBR rt1,rt2,r gives: r = a b c d e f g h
```

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computer implemented comprising the steps of:
   (a) in response to a mix half-word left instruction, concatenating a first half-word of a first double-word, a first half-word of a second double-word, a third half-word of the first double-word and a third half-word of the second double-word and placing the result in a third double-word; and,
   (b) in response to a mix half-word right instruction, concatenating a second half-word of the first double-word, of second half-word of the second double-word, a fourth half-word of the first double-word and a fourth half-word of the second double-word and placing the result in the third double-word.

2. A computer implemented method as in claim 1, additionally comprising the steps of:
   (c) in response to a mix byte left instruction, concatenating a first byte of the first doubleword, a first byte of the second doubleword, a third byte of the first doubleword, a third byte of the second doubleword, a fifth byte of the first doubleword, a fifth byte of the second doubleword, a seventh byte of the first doubleword and a seventh byte of the second doubleword and placing the result in the third doubleword; and,
   (d) in response to a mix byte right instruction, concatenating a second byte of the first doubleword, a second byte of the second doubleword, a fourth byte of the first doubleword, a fourth byte of the second doubleword, a sixth byte of the first doubleword, a sixth byte of the second doubleword, an eighth byte of the first doubleword and an eighth byte of the second doubleword and placing the result in the third doubleword.

3. A computing system comprising:
   a first doubleword register;
   a second doubleword register;
   a third doubleword register;
   mix circuitry, coupled to the first doubleword register, the second doubleword register and the third doubleword register, for, in response to a mix half-word left instruction, concatenating a first half-word of the first doubleword register, a first half-word of the second doubleword register, a third half-word of the first doubleword register and a third half-word of the second doubleword register and placing a result in the third doubleword register.

4. A computing system comprising:
   a first doubleword register;
   a second doubleword register;
   a third doubleword register;
   mix circuitry, coupled to the first doubleword register, the second doubleword register and the third doubleword register, for, in response to a mix byte left instruction, concatenating a first byte of the first doubleword register, a first byte of the second doubleword register, a third byte of the first doubleword register, a third byte of the second doubleword register, a fifth byte of the first doubleword register, a fifth byte of the second doubleword register, a seventh byte of the first doubleword register and a seventh byte of the second doubleword register and placing a result in the third doubleword register.

5. A computing system comprising:
   a first doubleword register;
   a second doubleword register;
   a third doubleword register;
   mix circuitry, coupled to the first doubleword register, the second doubleword register and the third doubleword register, for, in response to a mix half-word right instruction, concatenating a second half-word of the first doubleword, register, a second half-word of the second doubleword register, a fourth half-word of the first doubleword register and a fourth half-word of the second doubleword register and placing a result in the third doubleword register.

6. A computing system comprising:
   a first doubleword register;
   a second doubleword register;
   a third doubleword register;
   mix circuitry, coupled to the first doubleword register, the second doubleword register and the third doubleword register, for, in response to a mix byte right instruction, concatenates a second byte of the first doubleword register, a second byte of the second doubleword register, a fourth byte of the first doubleword register, a fourth byte of the second doubleword register, a sixth byte of the first doubleword register, a sixth byte of the second doubleword register, an eighth byte of the first doubleword register and an eighth byte of the second doubleword register and places a result in the third doubleword register.

7. A computer implemented method comprising the steps of:

(a) in response to a mix byte left instruction, concatenating a first byte of a first doubleword, a first byte of a second doubleword, a third byte of the first doubleword, a third byte of the second doubleword, a fifth byte of the first doubleword, a fifth byte of the second doubleword, a seventh byte of the first doubleword and a seventh byte of the second doubleword and placing the result in a third doubleword; and, (b) in response to a mix byte right instruction, concatenating a second byte of the first doubleword, a second byte of the second doubleword, a fourth byte of the first doubleword, a fourth byte of the second doubleword, a sixth byte of the first doubleword, a sixth byte of the second doubleword, an eighth byte of the first doubleword and an eighth byte of the second doubleword and placing the result in the third doubleword.

8. A computing system comprising:

a first register;

a second register;

a third register mix circuitry, coupled to the first register, the second register and the third register, for mixing multiple sub-word items packed into the first register and the second register, the multiple sub-word items when mixed being placed in the third register, the mixing circuitry comprising:

a plurality of multiplexors arranged in rows, wherein
a first portion of the plurality of multiplexors being arranged in a first row of the multiplexors, each multiplexor in the first portion receiving a multiple sub-word item from each of the first register and the second register, and,
a second portion of the plurality of multiplexors being arranged in a last row of the multiplexors, each multiplexor in the last portion placing a sub-word item within the third register.

9. A computing system as in claim 8, additionally comprising:

control circuitry, coupled to the plurality multiplexors, for generating control signals which control the mixing of multiple sub-word items by the multiplexors.

10. A computing system as in claim 8, wherein the plurality of multiplexors are arranged in a single row so that first row of the multiplexors is also the last row of the multiplexors, and the first portion of multiplexors is identical with the last portion of the plurality of multiplexors.

11. A computing system as in claim 8, wherein the mix circuitry, in response to an instruction, concatenates a subfield from the first register to a subfield from the second register wherein the subfield from the first register is not contiguous to the subfield from the second register when the first register and the second register are concatenated.

12. A computing system as in claim 11, wherein the mix circuitry concatenates more than one subfield from the first register with more than one subfield from the second register.

13. A computing system as in claim 12, wherein the mix circuitry alternately concatenates subfields from the more than one subfield from the first register and the more than one subfield from the second register.

14. A computing system comprising:

a first register;

a second register;

a third register mix circuitry, coupled to the first register, the second register and the third register, for mixing multiple sub-word items packed into the first register and the second register, the multiple sub-word items when mixed being placed in the third register, the mixing circuitry comprising:

a selecting means for making a selection of which sub-word items to be placed in the third register, wherein the selection varies depending upon a control value placed on control inputs to the selecting means, and control circuitry, coupled to the control inputs to the selecting means, for placing the control value on the control inputs.

15. A computing system as in claim 14, wherein the mix circuitry, in response to an instruction, concatenates a subfield from the first register to a subfield from the second register wherein the subfield from the first register is not contiguous to the subfield from the second register when the first register and the second register are concatenated.

16. A computing system as in claim 15, wherein the mix circuitry concatenates more than one subfield from the first register with more than one subfield from the second register.

17. A computing system as in claim 15, wherein the mix circuitry alternately concatenates subfields from the more than one subfield from the first register and the more than one subfield from the second register.

* * * * *